United States Patent
Clingerman et al.

(10) Patent No.: US 7,132,181 B2
(45) Date of Patent: Nov. 7, 2006

(54) METHOD AND APPARATUS FOR VENTING AND PURGING OF A FUEL CELL

(75) Inventors: Bruce J Clingerman, Palmyra, NY (US); Kiran Mallavarapu, Rochester, NY (US); Bryan Tipton, Johnstown, PA (US); Rodney J Rhodes, Honeoye Falls, NY (US); Robert Chalfant, Farmington, NY (US)

(73) Assignee: General Motors Corporation, Detroit, MI (US)

( * ) Notice: Subject to any disclaimer, the term of this patent is extended or adjusted under 35 U.S.C. 154(b) by 416 days.

(21) Appl. No.: 10/637,832

(22) Filed: Aug. 8, 2003

(65) Prior Publication Data

US 2005/0031922 A1    Feb. 10, 2005

(51) Int. Cl.
*H01M 8/04* (2006.01)
(52) U.S. Cl. .......................... 429/13; 429/22
(58) Field of Classification Search .................. 429/13, 429/22, 23, 24, 25
See application file for complete search history.

(56) References Cited

U.S. PATENT DOCUMENTS

| | | | |
|---|---|---|---|
| 5,870,914 A * | 2/1999 | Dawson | 340/5.55 |
| 6,395,414 B1 * | 5/2002 | Clingerman et al. | 429/13 X |
| 6,727,012 B1 * | 4/2004 | Chen et al. | 429/17 |
| 6,828,048 B1 * | 12/2004 | Margiott et al. | 429/13 X |
| 6,887,606 B1 * | 5/2005 | Parr et al. | 429/22 |
| 2003/0072978 A1 * | 4/2003 | Meyer et al. | 429/13 |
| 2005/0074660 A1 * | 4/2005 | Linder et al. | 429/13 X |

* cited by examiner

*Primary Examiner*—Stephen J. Kalafut
(74) *Attorney, Agent, or Firm*—Harness, Dickey & Pierce, P.L.C.

(57) ABSTRACT

Hydrogen in a fuel cell is vented and purged with a fail-closed valve using stored energy (e.g. from a capacitor) when a diagnostic parameter is outside of an acceptable operating range. The valve closes after the stored energy has depleted. A safety switch in the relay circuit of the solenoid switch (or solenoid valve) is also grounded in computer-implemented shutdowns. Benefits from the invention include use of air-compatible catalysts, minimized parasitic losses to power output, minimized contamination of fuel cell internal surfaces after venting, minimized risk of explosive mixture buildup, and efficient operation.

13 Claims, 3 Drawing Sheets

METHOD AND APPARATUS FOR VENTING AND PURGING OF A FUEL CELL

FIELD OF THE INVENTION

The present invention relates to an apparatus and to a method for shutdown and venting of a fuel cell stack in a fuel cell power system.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (fuel cell stack) within a fuel cell power system, individual fuel cells have flow fields with inlets to fluid manifolds; these collectively provide channels for the various reactant and cooling fluids reacted in the fuel cell stack to flow into each cell. Gas diffusion assemblies then provide a final fluid distribution to further disperse reactant fluids from the flow field space to the reactive anode and cathode.

Coordinated shutdown is one factor in effective operation of a fuel cell stack or set of fuel cell stacks. In this regard, hydrogen is a substantive component of the fuel fed to the reactive anodes of the fuel cell stack, and, upon shutdown, a working inventory of hydrogen-containing fuel is present in the fuel reactant channels of the fuel cell stack. While not inherently flammable as relatively high concentration hydrogen, the residual fuel in the stack is subject to potential mixing with oxygen in air, especially if the fuel cell is inoperable for a period of time. Such mixing of oxygen has the potential to create a potentially flammable mixture within the fuel cell stack at a certain threshold composition.

Two general shutdown strategies or modes represent the scope of shutdown approaches of a fuel cell system: a "normal" shutdown mode and a "rapid" shutdown mode. "Normal" shutdown proceeds through a process of (a) disconnecting the load, (b) consuming excess hydrogen, and (c) cooling the system in a manner to minimize internal stresses induced from thermal change. With a "rapid" shutdown, conditions are present such as a malfunction or error detection which require the fuel cell to be shut down in a manner which does not enable the time needed for consuming excess hydrogen. When a "rapid" shutdown is implemented, the residual fuel is handled by venting reformate or hydrogen to the atmosphere.

There are typically two venting solenoid valves for fuel reactant in a conventional fuel cell stack of a fuel cell power system: a first valve at the outlet of the fuel processor generating the fuel and a second valve at the outlet of the anode manifolds of the stack. During normal operation, these venting valves are closed to prevent hydrogen leakage and/or discharge to the atmosphere. Conventional fuel cell power systems not having a fuel processor typically use at least one vent valve on the stack anode. During a "rapid" shutdown, each venting valve opens to vent hydrogen to the atmosphere. This approach rapidly removes potential and thermal energy from the system and vents residual hydrogen within the fuel cell.

These vent valves have traditionally been provided as normally-open valves in which the valve is biased open via spring returns. As should be apparent, in the powered-down state, these valves are open and therefore allow fluid flow into and out of the anode manifolds. The fail-open valve is deployed so that the system vents fuel out the combustible vent even during a full loss of system power (usually the most dramatic "rapid" shutdown situation). As should also be apparent, a normally-open vent valve remains open after the system has shutdown in the continued absence of any electrical power. Such as when the system is turned off.

One disadvantage, however, in using normally-open vent valves is that, in some particular shutdown instances where the vent valves remain open, some residual hydrogen remains in the fuel cell manifolds. When a long downtime ensues, it is possible for air to flow through the vent over time until a combustible mixture occurs in some part of the system. It is also possible for a combustible mixture to evolve when power failure occurs after a "normal" shutdown executed without a purge (e.g., a "normal shutdown" initiated under controlled conditions which deteriorates into a "rapid" shutdown due to power loss).

Another disadvantage in using normally-open vent valves is that catalyst deactivation may ensue after shutdown of the fuel cell and loss of power. In this regard, a number of catalysts deactivate in the presence of air, especially immediately after shutdown when the catalyst is still thermally "hot". One approach to handling this concern is to use an air tolerant catalyst; but this approach severely hampers the choice of possible catalysts. Another approach is to provide a purge mechanism whereby hydrogen is purged from the system with an inert gas such as nitrogen to provide a nitrogen blanket over the active catalyst elements. Such alternatives define a more expensive design than is achievable with a catalyst not as air tolerant.

A further disadvantage in using normally-open vent valves is that, in powered-down mode, a path to the fuel processor and/or stack manifolds is available for dust and other potentially harmful elements to contaminate the internal channels and surfaces of the fuel cell. Such contamination shortens fuel cell life and also may diminish fuel cell performance in comparison to a fuel cell which is not contaminated.

An additional disadvantage in using normally-open vent valves derives from controller lockup where the control computer for the fuel cell system establishes fail-last control element positioning. In this context, the normally-open vent valves may be inappropriately sustained in a closed position.

Yet another disadvantage in using normally-open vent valves derives from the fact that all normally-open valves must be energized to remain shut—the primary operating state of vent valves. As such, these normally-open vent valves constitute a parasitic power burden on the fuel cell power system in normal real-time operation, inherently lowering overall operating system efficiency.

What is needed is a holistic approach to fuel cell venting and purging which provides coordinated shutdown of the fuel cell at low cost, protection of the catalyst after a power failure in the fuel cell power system, a basis for appropriate shutdown of the fuel cell stack and/or fuel cell stack set when conditions collectively indicate the need for such an operational event, and optimal efficiency in fuel cell power system operation. The present invention is directed to fulfilling this need.

SUMMARY OF THE INVENTION

The present invention provides a fuel cell with a normally-closed valve in fluid connection with the fuel reactant flow field(s) to vent the fuel reactant gases from the fuel reactant flow field(s). The normally-closed valve is operably disposed in an energizing circuit configured to open the normally-closed valve when a control signal is less than a shutdown threshold value.

As a method, the invention provides a fuel cell where venting of the fuel reactant from the fuel reactant flow field(s) is done with a normally-closed valve when a control signal has a value less than a shutdown threshold value. The invention further provides for closing of the normally-closed valve after the fuel reactant vents to a safe quantity in the fuel cell.

In one form, the invention provides for using a normally-closed solenoid switch in a control circuit so that the normally-closed valve vents the fuel reactant from the fuel cell when the solenoid relay circuit is powered at a voltage below a shutdown threshold voltage value. In another form, the invention provides for using a solenoid valve with the energizing circuit linked directly to the relay circuit of the valve.

The invention also provides for use of a safety switch in the solenoid relay circuit. An output voltage is measured with the control computer, an operational status variable is defined using executable logic in the computer from the output voltage measurement, and the solenoid relay circuit is grounded with the safety switch when the operational status variable is defined to a shutdown value.

The invention also provides for use of discrete electrical energy storage (e.g., a capacitor) of sufficient magnitude to open the normally-closed valve until the fuel reactant vents from the fuel cell. In this regard, the invention provides for storing sufficient electrical energy to sustain the normally-closed valve in an open position until the fuel reactant vents to a satisfactory level in the venting step, opening the normally-closed valve with the stored electrical energy to vent the fuel reactant, and closing the normally-closed valve after the stored electrical energy has been depleted.

Benefits from the present invention include (a) cost savings from eliminating the need to use of air-compatible catalysts; (b) minimized parasitical losses to power output from the fuel cell stack venting system; (c) minimized contamination of internal fuel cell stack manifolds and surfaces after venting; and (d) an avoidance of a combustible air/fuel mixture in the anode after shutdown.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
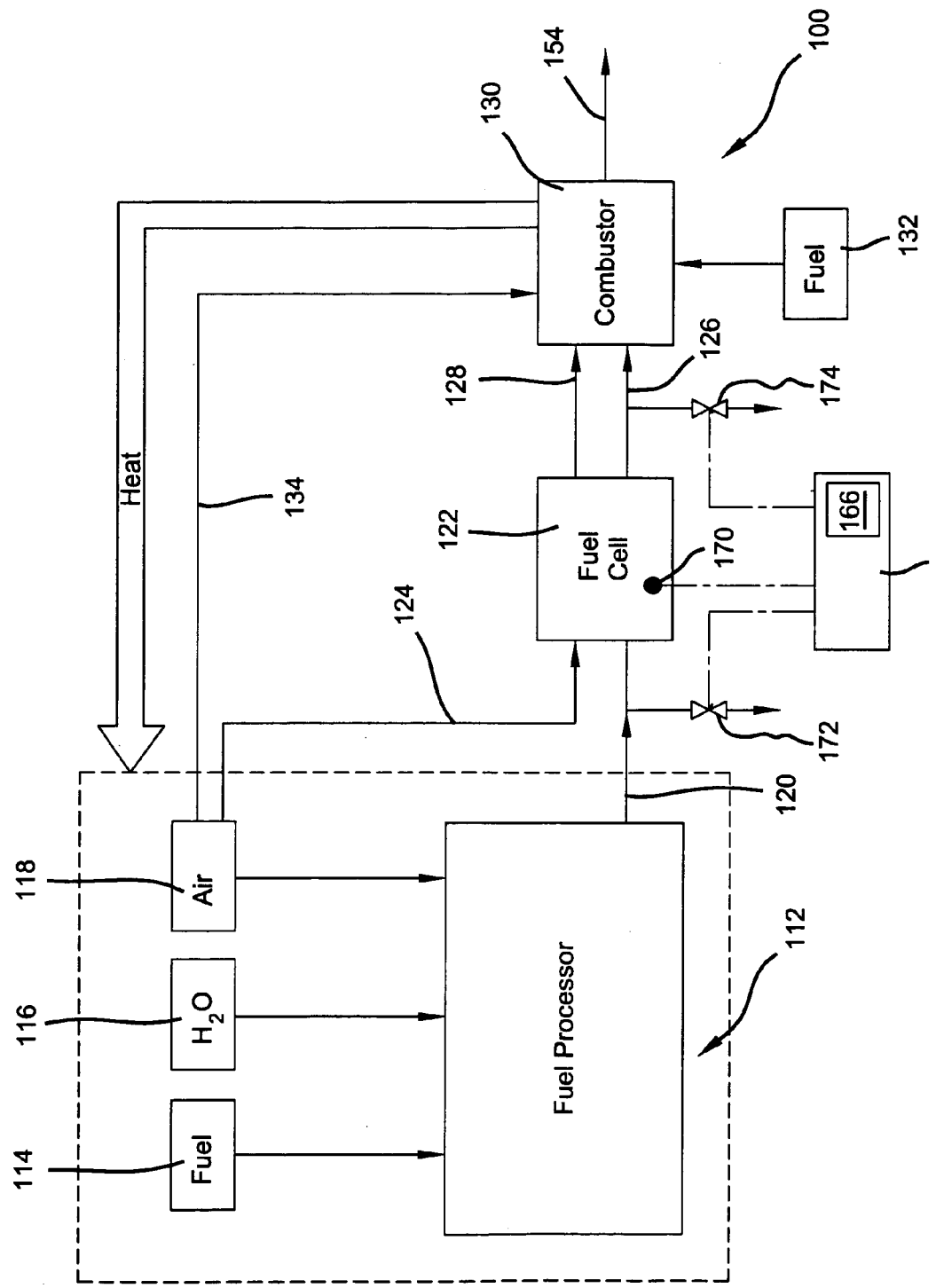
FIG. 1 presents a fuel cell power system block flow diagram.

The following description of the preferred embodiment is merely exemplary in nature and is in no way intended to limit the invention, its application, or uses.

Real-time computer process control is generally implemented to control the fuel cell power system described herein. In this regard, real-time computer processing is broadly defined as a method of computer processing in which an event causes a given reaction within an actual time limit, and wherein computer actions are specifically controlled within the context of and by external conditions and actual times. As an associated clarification in the realm of process control, real-time computer controlled processing relates to the performance of associated process control logical decision, and quantitative operations intrinsic to a process control decision program functioning as part of a controlled apparatus implementing a process (such as the fuel cell benefiting from the present invention) wherein the process control decision program is periodically executed with fairly high frequency usually having a period of between 20 ms and 2 sec for tactical control.

The preferred embodiments use at least one normally-closed valve to vent fuel reactant from the fuel cell stack. In this regard, a normally-closed valve is a valve, for automatic control, closed to fluid transmission when electrical power (or pneumatic pressure) is absent from the actuator of the valve. It should also be noted that a normally-closed switch is usually a spring-loaded switch which is positioned ("electrically closed") to enable electrical current transmission when electrical power (or any counter-force to the spring) is absent from the actuating relay circuit of the (spring-loaded) switch.

In one embodiment, an electrical circuit having a capacitor energizes the normally-closed vent valve from the capacitor when a solenoid relay of the circuit is in a power-off or shutdown condition so that a (first) electrical switch in mechanical linkage with the relay electrically "closes" for a period of time to enable the capacitor to discharge through the actuator of the valve. The capacitor is sized to hold the normally-closed vent valve open for a time period sufficient for venting fuel cell fuel reactant to a satisfactory level in the system.

During normal (non-rapid-shutdown mode) operation in a preferred embodiment, the real-time computer controller energizes the solenoid relay to a position enabling the computer controller to control the vent valves in real-time operation through a second electrical switch of the solenoid. Note that the non-energized solenoid relay of this embodiment with two active electrical switches provides a closed circuit with respect to enabling the energy-storing capacitor to discharge even as the energized solenoid relay provides a first closed contact via the second electrical switch between the control computer and the vent valve, and a second closed contact via the first electrical switch to enable charging of the capacitor. The charging circuit of the capacitor via the first electrical switch is further stabilized by a diode.

Power loss in the system below a threshold value releases the solenoid relay into a position where the first electrical switch is commensurately positioned to discharge the capacitor through the actuator of the fail-closed valve. The capacitor discharges the stored energy for a particular duration of time until it has essentially completely discharged its energy store. During this discharge of energy, the vent valve is energized and hence remains in an open position until the electromagnetic force from the solenoid is overcome by the spring force of the valve causing the valve to close. Thus, the vent valve defaults into a fluidly closed configuration since there is no longer sufficient power to sustain it in open position against its closing spring. This action reseals the fuel cell stack to prevent the anode side of the fuel cell from ongoing exposure to the atmosphere in the shutdown state after the residual fuel has been vented or purged from the fuel cell.

The present invention is further understood with reference to a generic fuel cell power system. Therefore, before further describing the invention, a general overview of the power system within which the present invention operates is provided. In the system, a hydrocarbon fuel is processed in a fuel processor, for example, by reformation and partial oxidation processes, to produce a reformate gas which has a relatively high hydrogen content on a volume or molar basis. Therefore, reference is made to hydrogen-containing as having relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons or hydrogen storage-based systems.

As shown in FIG. 1, a fuel cell power system 100 includes a fuel processor 112 for catalytically reacting a reformable hydrocarbon fuel stream 114, and water in the form of steam from a water stream 116. In some fuel processors, air is also used in a combination partial oxidation/steam reforming reaction. In this case, fuel processor 112 also receives an air stream 118. The fuel processor 112 contains one or more reactors wherein the reformable hydrocarbon fuel in stream 114 undergoes dissociation in the presence of steam in stream 116 and air in stream 118 (optionally oxygen from oxygen storage tank 118) to produce the hydrogen-containing reformate exhausted from fuel processor 112 in reformate stream 120. Fuel processor 112 typically also includes one or more downstream reactors, such as water-gas shift (WGS) and/or preferential oxidizer (PrOx) reactors that are used to reduce the level of carbon monoxide in reformate stream 120 to acceptable levels, for example, below 20 ppm. $H_2$-containing reformate 120 or anode feed stream is fed into the anode side flow fields of fuel cell stack system 122. Concurrently, a cathode feed stream in the form of air in stream 124 is fed into the cathode side flow fields of fuel cell stack system 122. The hydrogen from reformate stream 120 and the oxygen from oxidant stream 124 react in fuel cell stack system 122 to produce electricity.

Anode exhaust (or effluent) 126 from the anode side of fuel cell stack system 122 contains some unreacted hydrogen. Cathode exhaust (or effluent) 128 from the cathode side of fuel cell stack system 122 may contain some unreacted oxygen. These unreacted gases represent additional energy recovered in combustor 130, in the form of thermal energy, for various heat requirements within power system 100. Specifically, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 154 to the environment, and the heat generated thereby is directed to fuel processor 112 as needed.

Vent valve 172 is operably disposed in anode feed stream 120 between the hydrogen source 112 and the fuel cell 122. Likewise, vent valve 174 is operably disposed in anode exhaust stream 126. Vent valves 172, 174 provide normally closed valves for venting fuel reactant from fuel cell stack 122 to the atmosphere when a diagnostic parameter measured by sensor 170 falls outside of an acceptable operating range thus indicating that a shutdown process should be initiated. Real-time computer 164 effect issues a control signal to control of vent valves 172, 174 in response to a signal from sensor 170. The hydrogen feed to fuel cell stack system 122 is controlled in part through manipulation of vent valves 172, 174 by real-time computer 164 with respect to measurements from sensor 170 in enabling hydrogen-containing gas to flow to fuel cell system 122.

Sensor 170 is illustrated in FIG. 1 as measuring a diagnostic parameter associated with or internal to fuel cell stack 122. Exemplary stack diagnostic parameters may include: voltage of a cell, a cluster of cells or the fuel cell stack; pressure differential across the stack inlet (i.e., the anode and cathode inlets); relative humidity within the fuel cell stack; or operating temperature of the fuel cell stack. The diagnostic parameter may also be associated with other components of the fuel cell power system 100 outside of an external to the fuel cell stack 122 such as the fuel processor 112, the fuel, air or water supply for feed streams 114, 116, 118 or the combustor 130. An exemplary system diagnostic parameter includes operating parameters of an air compressor providing air feed stream 118 such as compressor speed or air discharge temperature. The diagnostic parameter may be determined directly (i.e., measured) from sensor 170 as indicated in FIG. 1 such as a measured cell voltage. Alternately, the diagnostic parameter may be determined indirectly (i.e. computed based on an analytical or empirical model) such as computing the relative humidity based on the pressure, temperature and load on the fuel cell stack. Thus, one skilled in the art will recognize that the present invention has utility with a wide variety of diagnostic parameters for indicating that a shutdown process should be initiated.

Controller logic 166 is provided in real-time computer 164 for execution in real-time by computer 164. In this regard, controller logic 166 is also denoted as "software" and/or a "program" and/or an "executable program" within real-time computer 164 as a data schema holding data and/or formulae information and/or program execution instructions. Controller logic 166 is, in a preferred embodiment, machine code resident in the physical memory storage (i.e., without limitation, "RAM" "ROM" or a computer disk) of computer 164. Controller logic 166 is preferably derived from a source language program compiled to generate the machine code. The physical memory storage is in electronic data communication with a central processing unit (CPU) of computer 164 which reads data from the physical memory, computationally modifies read data into resultant data, and writes the resultant data to the physical memory. Computer 164 also reads control signals from sensor 170 and effects control signals to valves 172 and 174 according to the provisions of controller logic 166. In one embodiment, computer 164 and executable code for controller logic 166 are provided as an ASIC (application-specific integrated circuit).

Sensor 170 is used as a feedback sensor to generate a control signal for initiating shutdown of the fuel cell stack 122. Along with other feedback loops and control decisions (not shown), computer-implemented determination of fuel cell operating parameters via measurements from sensor 170 are used in computer-implemented control (effected in controller logic 166) of vent valves 172, 174. Furthermore, the control signal for initiating shutdown may be based on an evaluation of one or more diagnostic parameters.

Figure 2:
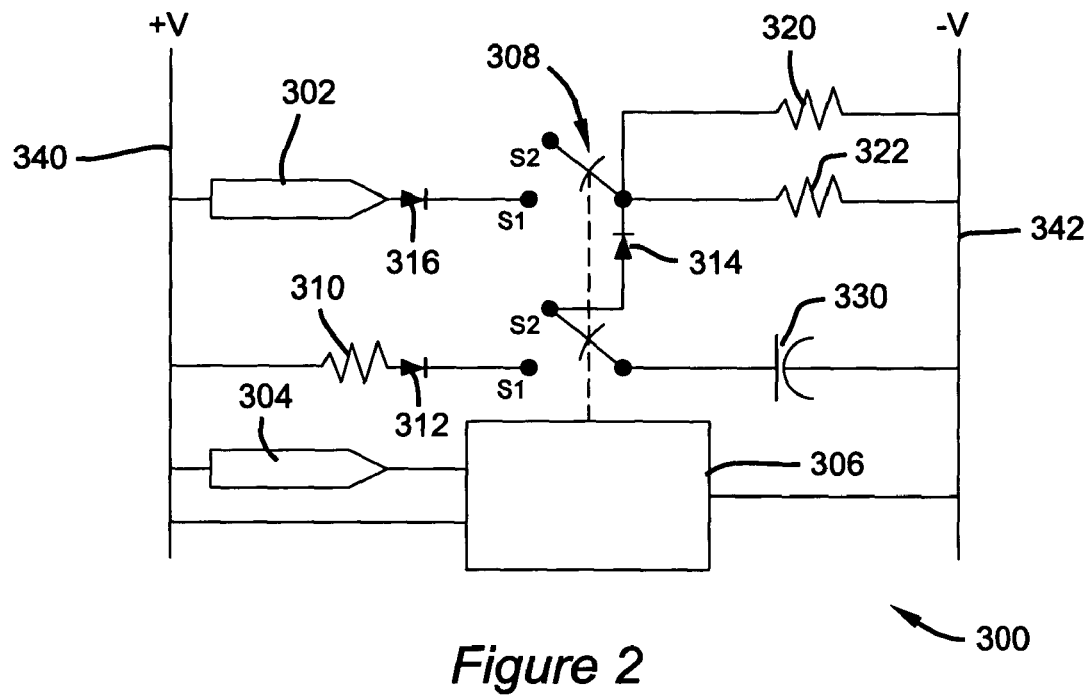
FIG. 2 shows a vent valve control circuit in tripped state (closed position to discharge the capacitor of the circuit) for controlling two vent valves with one normal shutdown controller interface and one energy storage capacitor.
Figure 3:
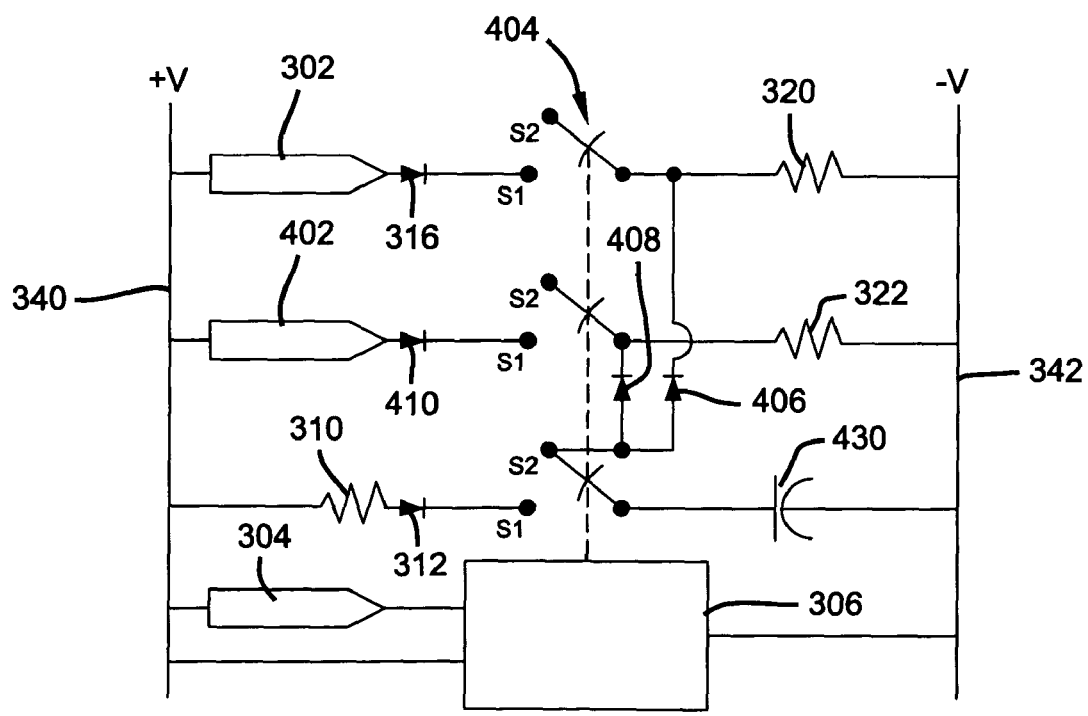
FIG. 3 shows a vent valve control circuit in tripped state (closed position to discharge the capacitor of the circuit) for controlling two vent valves with two normal shutdown controller interfaces and one energy storage capacitor.

FIG. 2 presents single vent valve control circuit 300 in tripped state or de-energized (S2) position for controlling two vent valves with one normal shutdown controller interface and one energy storage capacitor 330. Control circuit 300 includes controller interfaces 302, 304 and a pair of switches 308 operated by relay 306. Control circuit 300 also includes a charging circuit having a resistor 310, diode 312 and capacitor 330. In FIG. 3, vent valves 172 and 174 are represented by resistors 320 and 322, respectively, in circuit 300. Capacitor 330 is charged via charging resistor 310 and diode 312 when relay 306 holds switch 308 in energized (S1) position (note that switch 308 is shown in S2 position to discharge capacitor 330 in FIG. 3), and capacitor 330 is discharged via diode 314 to open normally-closed valves 320 and 322 when relay 306 releases switch 308 to S2 position.

Controller 304 represents control computer 164, rapid shutdown logic in controller logic 166, and a safety switch controlled by computer 164 for grounding the relay circuit of relay 306. Control computer 164 measures output voltage via sensor 170, defines an operational status variable with executable logic in controller logic 166 from the voltage as measured, and electrically grounds the solenoid relay circuit of relay 306 when the operational status variable is defined to a shutdown value.

Controller 302 also represents control computer 164, operational and normal shutdown logic in controller logic 166, and a transistor 314 controlled by computer 164 for adjusting the positions of valves 172 and 174 via diode 316 in real-time operation when switch 308 is in S1 position. Note that diode 316 conducts electricity to resistors 320 and 322 via a second electrical switch of solenoid switch 308. In effect, circuit 300 effectively provides three separate conditionally-operative internal electrical circuits where a first circuit is electrically active in the de-energized position of the solenoid and the other two circuits are electrically active in the complementary energized position of the solenoid. In this regard, note that a "closed" and de-energized solenoid switch 308 in S2 position provides a first electrically closed circuit with respect to enabling energy storing capacitor 330 to discharge; and an "open" and energized solenoid switch 308 in S1 position provides (a) a second electrically closed circuit between control computer 164 and vent valves 172 and 174 via resistors 320 and 322 and (b) a third electrically closed circuit between resistor 310, diode 312, and capacitor 330 for charging capacitor 330.

In brief reference to FIG. 1, control lines are depicted between computer 164 and each of vent valves 172, 174. These control lines respectively summarily reference the separate controller outputs 302, 304 in FIG. 2, as well as the division between the normal shutdown controller and the rapid shutdown controller shown for each valve in FIGS. 3 and 4. Note that in FIG. 1, the power loss relay 306 and the double throw switch 308 (shown in FIGS. 2–4) are internal to the controller 164 and thus not shown separately.

Returning to a consideration of FIG. 2, when solenoid switch 308 is in S1 position, capacitor 330 is charged through charge resistor 310 and diode 312 in circuit 300. Discharge of capacitor 330 is prevented in S1 position of switch 308 by diode 312. Voltage drop for circuit 300 is the difference between positive voltage source 340 and negative voltage drain 342.

A simplified vent system embodiment is enabled from consideration of circuit 300 without controllers 302 and 304, diode 316, and resistor 322 with switch 308 providing only one electrical contact between (in S1 position) charging resistor 310, diode 312, and capacitor 330 and (in S2 position) between capacitor 330, diode 314, and resistor 320. In such an embodiment, no real-time computer control of vent valve 172, and no safety switch shutdown is provided in reaction to the measurement of sensor 170; however, such an embodiment does provide normally-closed valve 172 in fluid connection with the fuel reactant flow field(s) of fuel cell stack 122 to vent the reactant gas from the fuel reactant flow field(s) where normally-closed valve 172 is disposed in an energizing circuit configured to open normally-closed valve 172 when the output voltage has a value less than the shutdown threshold voltage value necessary to retain the spring of relay 306 to keep switch 308 in S1 position.

Turning now to FIG. 3, an alternative embodiment shows vent valve control circuit 400 similar to control circuit 300. Control circuit 400 is in a tripped state (S2 position to discharge capacitor 430 of circuit 400) for controlling vent valves 172 and 174 with two normal shutdown controller interfaces 302 and 402 and one energy storage capacitor 430. This circuit is derived from circuit 300, with many elements reprised from FIG. 2 and labeled accordingly. However, controller 402 and diode 410 are configured in parallel with controller 302 and diode 316 to enable separate real-time independent manipulations of valves 172, 174 represented by resistors 320, 322. Note that solenoid switch 404 has three electrical switches on relay 306 instead of the two electrical switches of solenoid switch 308.

Figure 4:
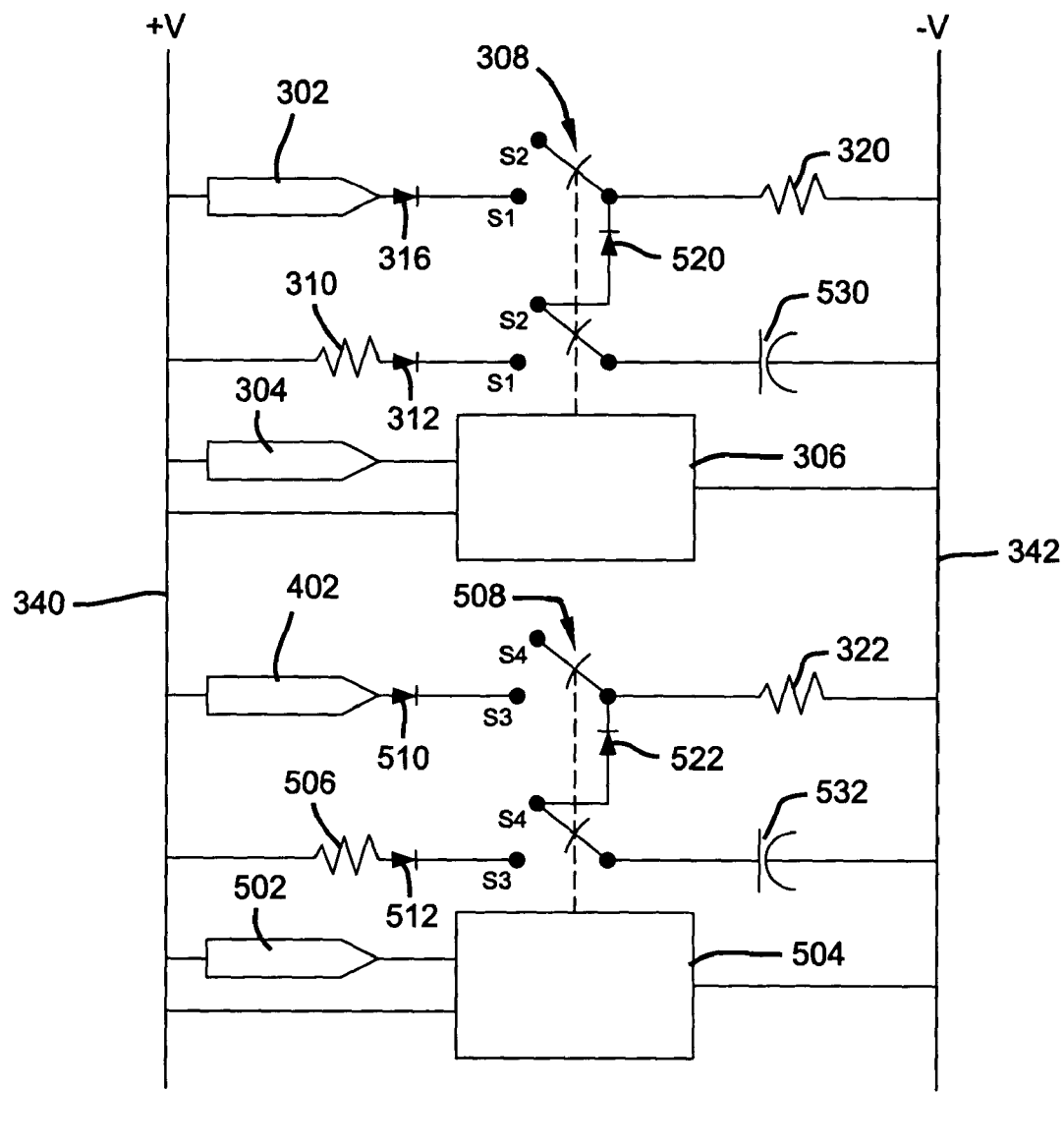
FIG. 4 shows dual vent valve control circuits with each in tripped state (closed position to discharge the capacitor of the circuit) for controlling two vent valves with two normal shutdown controller interfaces and two energy storage capacitors.

With reference to FIG. 4, an alternative embodiment shows dual vent valve control circuits 500 similar to circuits 300 and 400. Control circuit 500 shows each of switch 308 and switch 508 in tripped state (S2 position to discharge the capacitors of their circuits) for controlling vent valves 172 and 174 with two normal shutdown controller interfaces 302 and 402 and two energy storage capacitors 530 and 532. Controller 304 represents control computer 164, rapid shutdown logic in controller logic 166, and a safety switch controlled by computer 164 for grounding the relay circuit of relay 306. Controller 502 represents control computer 164, rapid shutdown logic in controller logic 166, and a safety switch controlled by computer 164 for grounding the relay circuit of relay 504. The dual circuits of FIG. 4 are each appreciated as essentially duplicates of circuit 300 except for the fully independent control of valves 172, 174 represent by resistors 320, 322. This arrangement provides for custom and independent sizing of all circuit elements respective to each valve so that, for example, resistor 310 and resistor 506 are independently sized, capacitor 530 and capacitor 532 with their comparable charging resistors 310 and 506 and with their comparable diodes 312 and 512 are all independently sized, and discharge diodes 520 and 522 are independently sized to enable fully independent operation of valves 174 and 172. Fully independent executable logical sections in executable logic 166 in controllers 502, 402, 304, and 302 are also enabled in circuit 500.

As should be appreciated, other control elements (not shown) are also adjusted by computer 164 in providing control and shutdown of fuel cell power system 100 in alternative embodiments. In one embodiment, for example, a nitrogen purge (not shown) effects in a normal shutdown to forcefully displace residual hydrogen from the fuel cell stack 122. In another embodiment, a block valve is closed between fuel processor 112 prior to the fluid connection between fuel cell stack 122 and valve 172 so that fuel processor 112 is isolated from fuel cell stack 122 during shutdown.

Benefits of the described invention are the provision of a shutdown of a fuel cell, protection of the catalyst after a power failure in the fuel cell power system, a basis for appropriate shutdown of the fuel cell stack and/or fuel cell stack set when conditions collectively indicate the need for such an operational event, and optimal efficiency in fuel cell power system operation as parasitic power usage is minimized in the vent system. Post shutdown mixing of residual hydrogen fuel with air and contamination of the internal passages of the fuel cell stack are also prevented after the vent valves close after venting. Minimization of a "domino effect" of fuel cell component failures is also an auxiliary benefit of proper vent management upon shutdown. In some embodiments, the capacitors are designed to maintain sufficient hydrogen in the fuel cell system to enable prompt restart. The present invention also enables a design option for an air-sensitive catalyst to be deployed in the fuel processor of a fuel cell power system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
a fuel cell having an anode inlet and an anode outlet;
a reactant fuel source in fluid communication with said anode inlet;
a normally-closed valve in fluid communication with said reactant fuel source and said anode inlet and operable to selectively vent a reactant fuel from said fuel cell in response to a control signal;
a controller communicating with said normally-closed valve and including a shutdown control circuit generating said control signal to selectively open said normally-closed valve when said control signal is less than a shutdown threshold value; and
an electrical energy storage element directly coupled to said normally-closed valve, said electrical energy storage element storing a sufficient magnitude of electrical energy to maintain said normally-closed valve in an open position for a time period sufficient to vent said reactant fuel from said fuel cell.

2. The fuel cell system of claim 1 further comprising a solenoid switch coupled to said normally-closed valve, said solenoid switch positionable between a first position when said control signal is greater than or equal to said shutdown threshold value and a second position when said control signal circuit is less than said shutdown threshold value.

3. The fuel cell system of claim 1 further comprising a switch in a relay circuit in communication with said controller, and executable logic in said controller for defining an operational status variable for said switch, wherein said switch electrically grounds said relay circuit to electrically close said shutdown control circuit when said executable logic defines a shutdown value for said operational status variable so that said normally-closed valve vents said reactant fuel from said fuel cell.

4. The fuel cell system of claim 1 wherein said electrical energy storage element comprises a discrete electrical energy storage element.

5. The fuel cell system of claim 4 wherein said discrete electrical energy storage element comprises a capacitor.

6. The fuel cell system of claim 1 wherein said normally-closed valve is a solenoid valve.

7. The fuel cell system of claim 6 further comprising a switch in a relay circuit of said solenoid valve in communication with said controller, executable logic in said controller for defining an operational status variable for said switch, wherein said switch electrically grounds said relay circuit when said executable logic defines a shutdown value for said operational status variable so that said solenoid valve vents said reactant fuel from said fuel cell.

8. The fuel cell system of claim 6 wherein said electrical energy storage element comprises a discrete electrical energy storage element.

9. The fuel cell system of claim 8 wherein said discrete electrical energy storage element comprises a capacitor.

10. A method for venting a fuel cell stack in a fuel cell power system comprising:
providing a normally-closed valve in fluid communication with a fuel source and an inlet to the fuel cell stack;
determining a diagnostic parameter of the fuel cell power system;
generating a shutdown control signal when said diagnostic parameter is not within an acceptable operating range;
storing electrical energy in an electrical energy storage element;
venting a reactant fuel from the fuel cell stack by energizing a solenoid with said electrical energy storage element to open said normally-closed valve in response to said shutdown control signal and maintaining said normally-closed valve in an open position; and
de-energizing said solenoid to close said normally-closed valve.

11. The method of claim 10 further comprising determining said diagnostic parameter with a controller, defining a shutdown control signal with executable logic in said controller from said diagnostic parameter, and communicating said shutdown control signal from said controller to said normally-closed valve when said diagnostic parameter is outside of said acceptable operating range.

12. The method of claim 11 wherein said venting further comprises energizing a solenoid to open said normally-closed valve in response to said control signal and said closing further comprises de-energizing said solenoid to allow said normally-closed valve to close.

13. A fuel cell system comprising:
a fuel cell having an anode inlet and an anode outlet;
a reactant fuel source in fluid communication with said anode inlet;
a normally-closed valve in fluid communication with said reactant fuel source and said anode inlet and operable to selectively vent a reactant fuel from said fuel cell in response to a control signal;
a controller communicating with said normally-closed valve and including a shutdown control circuit generating said control signal to selectively open said normally-closed valve when said control signal is less than a shutdown threshold value; and
a switch in a relay circuit in communication with said controller, and executable logic in said controller for defining an operational status variable for said safety switch, wherein said switch electrically grounds said relay circuit to electrically close said shutdown control circuit to said normally-closed valve when said executable logic defines a shutdown value for said operational status variable so that said normally-closed valve vents said reactant fuel from said fuel cell.

* * * * *